Feb. 16, 1971   G. O. HUNTZINGER ET AL   3,564,369
MOTOR CONTROL SYSTEM FOR A DIRECT CURRENT TRACTION MOTOR
Filed July 2, 1968

INVENTORS.
Gerald O. Huntzinger, &
BY Donald O. Ruff

C. L. Meland
ATTORNEY

United States Patent Office 3,564,369
Patented Feb. 16, 1971

3,564,369
MOTOR CONTROL SYSTEM FOR A DIRECT
CURRENT TRACTION MOTOR
Gerald O. Huntzinger and Donald O. Ruff, Anderson, Ind., assignors to General Motors Corporation, Detroit, Mich., a corporation of Delaware
Filed July 2, 1969, Ser. No. 838,509
Int. Cl. H02p 7/28
U.S. Cl. 318—327                            7 Claims

ABSTRACT OF THE DISCLOSURE

A motor power supply system for a direct current traction motor which is coupled to the wheel of a motor vehicle to provide motive power for the vehicle. The traction motor is connected with a source of direct current through a switching device which takes the form of a silicon controlled rectifier. The controlled rectifier is switched alternately on and off and the time duration of the on and off periods of the controlled rectifier is controlled such that the on time is increased as motor speed increases. The time duration of the nonconducting periods, or off times of the controlled rectifier, is controlled as a function of the setting of an accelerator pedal for controlling the speed of the vehicle and as the accelerator pedal is depressed the off time is decreased.

---

This invention relates to motor control systems for direct current motors and more particularly to a motor control system wherein the motor is adapted to propel an electrically powered vehicle and wherein the voltage applied to the motor is controlled by a switching device connected between the source of direct current and the motor.

It is known in the art of motor control systems for direct current motors to control the voltage applied to the motor from a source of direct current by providing a switching device that is connected between the source of direct current and the motor. In one known system the on time of the switching device is maintained substantially constant while the switching frequency is varied to thereby control the voltage applied to the motor. In another type of motor control system the switching frequency is maintained constant and the on time varied to thereby control the voltage applied to the motor.

In operating a direct current propulsion motor for a motor vehicle from a source of direct current it is important to provide relatively short on times for the switching device in order not to exceed the current rating of the switching device or other components of the system. Thus, when the motor is at rest the counter EMF of the motor is zero with the result that the current supplied to the motor at this time is only limited by the resistance and inductance of the circuit connecting the source of direct current and the source of voltage when the switching device is switched on. On the other hand, as the motor accelerates the counter EMF increases and it is now desirable to increase the time duration of the conducting periods of the switching device to apply more voltage to the motor.

It accordingly is one of the objects of this invention to provide a motor control system for an electrically powered vehicle wherein a controlled rectifier connects a source of direct current and a propulsion motor and wherein the time duration of conducting and nonconducting rectifier is controlled respectively as a function of motor speed and accelerator pedal position. In carrying this object forward the time duration of the conducting periods of the controlled rectifier is increased with increasing motor speed. The time duration of the nonconducting periods of the controlled rectifier is decreased as the accelerator pedal or other manually controlled device is moved to call for increased speed of the propulsion motor and vehicle. With this arrangement the time duration of the conducting periods of the controlled rectifier is at a minimum when the vehicle is being accelerated from an at rest condition and the nonconducting or off time periods of the controlled rectifier is at a maximum. This limits the amount of current supplied to the direct current traction motor when the motor is being initially accelerated. On the other hand as motor speed increases and as the accelerator pedal is depressed sufficient voltage is applied to the motor to supply the required power for operating the vehicle.

Another object of this invention is to provide a motor control system of the type described wherein the nonconducting periods for the controlled rectifier are controlled by an RC timing circuit and wherein this RC timing circuit includes a variable resistor which is adjusted by the accelerator pedal of the vehicle.

Still another object of this invention is to provide a motor control system of the type described wherein the on and off conducting periods of the controlled rectifier is controlled as a function of motor speed and accelerator pedal position through a control circuit that includes a monostable multivibrator.

Figure 1:
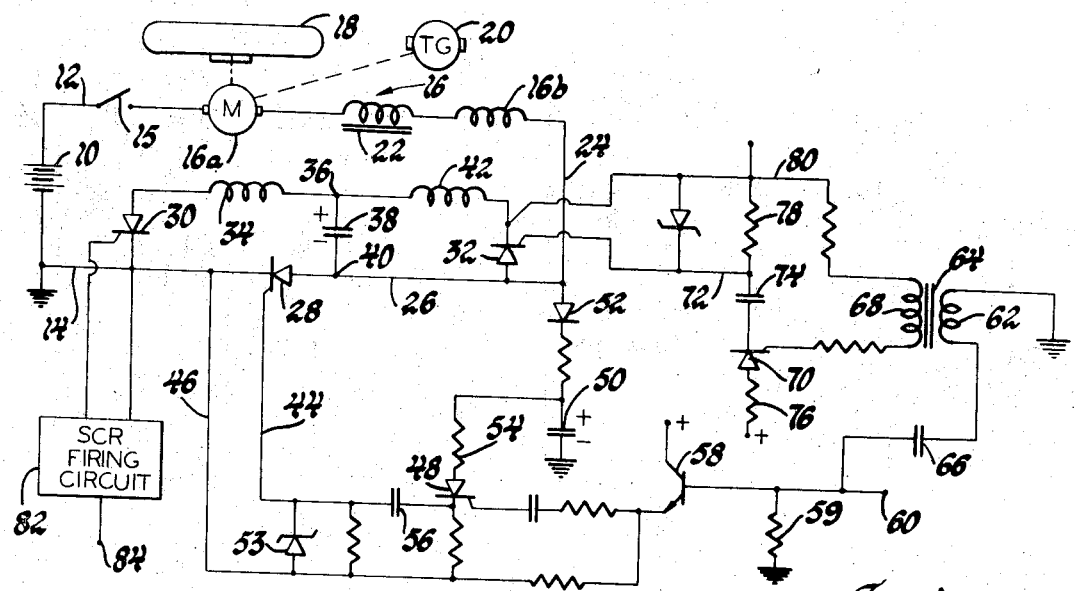
FIG. 1 is a schematic circuit diagram of a motor control system made in accordance with this invention.

Referring now to the drawings and more particularly to FIG. 1 the reference numeral 10 designates a source of direct current which has been illustrated as a battery. The source of direct current 10 preferably takes the form of a plurality of series connected batteries, for example, seven series connected lead-acid storage batteries to provide a nominal voltage between conductors 12 and 14 of eighty-four volts. The conductor 12 is connected in series with a manually operable switch 15 and this switch is connected in series with a direct current motor 16 which has an armature 16a and a series field 16b. The armature 16a of the motor 16 is mechanically connected to a driving wheel 18 of an electrically propelled vehicle. The motor may be mechanically connected to both rear wheels of a vehicle to provide motive power to the vehicle. The armature 16a of the motor is also mechanically connected to a tachometer generator 20 which has a direct voltage output which is a function of drive motor speed and vehicle speed. The generator 20 may be an alternating current generator with a rectified output or can be of the direct current type.

The armature 16a is connected in series with an inductor 22 and in series with the field winding 16b of the motor. The power supply circuit for the motor further includes conductors 24 and 26, the conductor 26 being connected in series with the anode-cathode circuit of a controlled rectifier 28 which forms a switching device for periodically connecting and disconnecting the source of direct current and the motor. The cathode of controlled rectifier 28 is connected with power supply conductor 14 and this conductor is connected to the negative side of the direct current source 10.

The motor control system further includes controlled rectifier 30, which will be hereinafter referred to as a blow out controlled rectifier, and a controlled rectifier 32 which will hereinafter be referred to as a turn around controlled rectifier. The cathode of controlled rectifier 30 is connected to conductor 14 and its anode to an inductor 34. The opposite side of the inductor 34 is connected with junction 36. A commutating capacitor 38 is connected between junction 36 and a junction 40 on conductor 26. An inductor 42 is connected between junction 36 and the cathode of the turn around controlled rectifier 32. The anode of controlled rectifier 32 is connected with conductor 26.

The function of the blow out controlled rectifier 30 is to provide a discharge path for capacitor 38 to turn off the power controlled rectifier 28 when it is desired to initiate a nonconducting period for the controlled rectifier 28. When the capacitor 38 is charged to the polarity shown in FIG. 1 it will be appreciated that the capacitor can discharge through the anode-cathode circuit of controlled rectifier 30 to raise the potential of the cathode of controlled rectifier 28 to turn it off whenever controlled rectifier 30 is gated conductive.

The purpose of the turn around controlled rectifier 32 is to ensure that the capacitor 38 will be charged to the polarity shown in FIG. 1 before controlled rectifier 30 is gated conductive. Thus, when controlled rectifier 30 is gated conductive to turn off controlled rectifier 28 the capacitor 38 will charge to a polarity which is opposite to its polarity illustrated in FIG. 1 but will then be charged to the polarity shown in FIG. 1 when the turn around controlled rectifier 32 is gated conductive. The charging of the capacitor 38 is controlled by the provision of the inductors 34 and 42.

The gate firing circuit for the controlled rectifier 28 is illustrated in FIG. 1 and includes a conductor 44 connected with the gate of controlled rectifier 28 and a conductor 46 connected with the cathode of controlled rectifier 28. This gate firing circuit further includes a controlled rectifier 48, a capacitor 50, a diode 52 and a Zener diode 53. The capacitor 50 can be charged from conductor 26 to a polarity indicated on FIG. 1 and when controlled rectifier 48 is gated conductive the capacitor discharges into the gate-cathode circuit of controlled rectifier 28 to gate it conductive. This discharge path is through resistor 54, the anode-cathode circuit controlled rectifier 48, capacitor 56, and then through conductor 44 to the gate of controlled rectifier 28.

Figure 2:
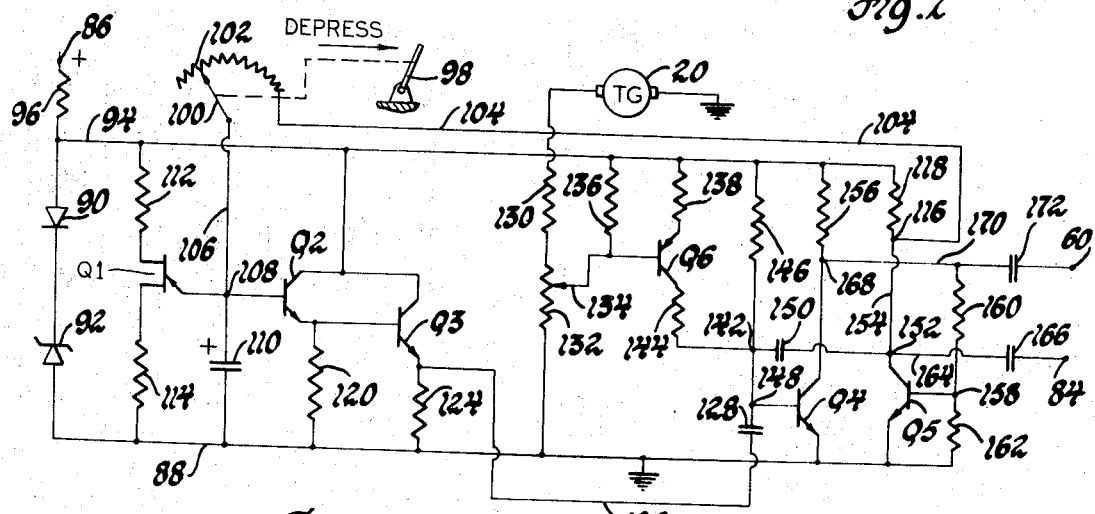
FIG. 2 is a schematic circuit diagram of a control circuit which controls the on and off times of the switching device shown in FIG. 1 connected between the source of direct current and the propulsion motor.

The controlled rectifier 48 will be gated conductive whenever an NPN transistor 58 is switched to a conductive condition. A resistor 59 connects the base of transistor 58 to ground. The emitter of transistor 58 is connected with the gate of controlled rectifier 48 through the circuit shown in FIG. 1 while the collector of this transistor is connected with the positive side of a source of direct current (which is not illustrated). The negative side of this source of direct current is connected with conductor 46 so that when transistor 58 is gated conductive the controlled rectifier 48 will be gated conductive to forward bias controlled rectifier 28. The base of transistor 58 is connected with a junction 60, which is shown in FIG. 2, and the potential of junction 60 varies in a manner to be described hereinafter to control the switching of transistor 58.

The controlled rectifier 32 is gated to a conductive condition at the same time that controlled rectifier 28 is gated conductive. In order to provide such an operation the junction 60 is connected with the primary 62 of a transformer 64 through a capacitor 66. When the voltage at junction 60 is positive, with respect to ground, current flows in the primary winding 62 to develop a voltage in the secondary winding 68 of the transformer. The secondary winding 68 applies a potential to the gate-cathode circuit of a controlled rectifier 70 which has its cathode connected to a conductor 72 through a capacitor 74. Controlled rectifier 70 is also connected in series with resistors 76 and 78 and these resistors, together with capacitor 74 and controlled rectifier 70, are connected across a source of direct current (which is not illustrated). The negative side of this source of direct current is connected with conductor 80 which in turn is connected to the cathode of controlled rectifier 32.

With the circuit arrangement that has just been described the voltage that is developed in secondary winding 68, when the voltage at junction 60 goes positive, turns on controlled rectifier 70 which applies a forward bias to controlled rectifier 32 through a circuit that includes conductor 72. It therefore will be appreciated that controlled rectifiers 28 and 32 are gated conductive simultaneously whenever the voltage of junction 60 increases in a manner to be more fully described in regard to FIG. 2.

The firing circuit for controlled rectifier 30 is connected with the gate and cathode electrodes of this controlled rectifier and is illustrated as a block diagram designated by reference numeral 82. This firing circuit is identical with the firing circuit for controlled rectifier 28 and includes a transistor like transistor 58 which is biased on and off by a signal applied to junction 84 which is also illustrated in FIG. 2.

The firing circuits for the controlled rectifiers can take a wide variety of forms, other than those shown in FIG. 1, as long as they can be controlled by the signals developed by the circuit of FIG. 2 which will now be described.

In FIG. 2 the reference numeral 86 designates a terminal which is connected to the positive side of a source of direct current which is not illustrated but which may be, for example, a fourteen volt direct current source. The negative side of this direct current source is connected with conductor 88. A diode 90 and a Zener diode 92 are connected across conductors 88 and 94 to provide a regulated direct voltage between conductors 94 and 88. A resistor 96 is connected in series with the positive terminal 86 of the control circuit shown in FIG. 2.

The purpose of the control circuit illustrated in FIG. 2 is to apply voltages to junctions 60 and 84 shown in FIG. 1 to thereby control the time periods of conduction and nonconduction of controlled rectifier 28. The time period of nonconduction, or the off time of controlled rectifier 28, is determined by the setting of a manually operable control device for the vehicle which is illustrated in FIG. 2 as an accelerator pedal 98. The accelerator pedal 98 is mechanically connected to a wiper 100 of a variable resistor 102. As the accelerator pedal is depressed the resistance between conductors 104 and 106 is decreased and when the accelerator pedal is in the full up position the resistance between conductors 104 and 106 is at a maximum.

The conductor 106 is connected with a junction 108 which in turn is connected with the emitter of a unijunction transistor Q1 and with one side of a capacitor 110. One of the base electrodes of the unijunction transistor Q1 is connected with conductor 94 through resistor 112 and the other base electrode is connected with conductor 88 through a resistor 114. The conductor 104 is connected with a junction 116 which in turn is connected to conductor 94 through a resistor 118. It can be appreciated from the foregoing that there is a charging circuit for capacitor 110 which can be traced from conductor 94, through resistor 118, through conductor 104, through variable resistor 102 and then through capacitor 110 to conductor 88. The rate at which the capacitor 110 charges is determined by the resistance of resistors 118 and 102 and the capacitance of capacitor 110. This circuit is an RC timing circuit having a time constant which can be varied by adjusting variable resistor 102 by accelerator pedal 98.

The control circuit of FIG. 2 further includes transistors Q2 and Q3. The base of transistor Q2 is connected with junction 108 while the collectors of transistors Q2 and Q3 are connected with conductor 94. The emitter of transistor Q2 and the base of transistor Q3 are connected to conductor 88 through a resistor 120. The emitter of transistor Q3 is connected to conductor 88 through resistor 124 and is also connected to conductor 126 which is connected in series with a capacitor 128.

The tachometer generator 20 which develops a direct voltage, the magnitude of which is a function of motor speed, is shown in FIG. 2 and is connected across a voltage divider provided by resistor 130 and a variable resistor 132. The tap 134 of variable resistor 132 is connected with the base of transistor Q6. The base of transistor Q6 is connected to conductor 94 through resistor 136 and the emitter of this transistor is connected to conductor 94 through resistor 138. The collector of transistor Q6 is connected with junction 142 through a resistor 144. A resistor 146 is connected between junction 142 and conductor 94 and it is seen that junction 142 is connected with junction 148 and therefore to one side of capacitor 128 and the base of transistor Q4. A capacitor 150 is connected between junctions 142 and 152, the junction 152 being connected with the collector of transistor Q5 and with conductor 154. The emitters of transistors Q4 and Q5 are connected to conductor 88 and the collector of transistor Q4 is connected with conductor 94 through a resistor 156.

The base of transistor Q5 is connected with junction 158 between resistors 160 and 162. The junction 152 is connected with output terminal 84, also illustrated in FIG. 1, through a conductor 164 and a capacitor 166. The other output terminal 60 is connected with junction 168 through conductor 170 and capacitor 172. It will be appreciated from an inspection of FIG. 2 that the transistors Q4 and Q5 and the circuit connecting these transistors form a monostable multivibrator and that the voltages at terminals 60 and 84 will vary as transistors Q4 and Q5 switch on and off. The voltage at junction 60 is low when transistor Q4 is switched on and is high when transistor Q4 is switched off. Similarly the voltage at terminal 84 is low when transistor Q5 is switched on and is high when transistor Q5 is switched off.

The operation of the motor control system will now be described with reference to the drawings and to the graphical representation illustrated in FIG. 3 where V110 indicates the voltage across capacitor 110, VQ5 the voltage across transistor Q5 and V28 the voltage across controlled rectifier 28 all plotted against time.

Assuming now that the operator of a motor vehicle has closed the switch 15, the voltage applied to the motor 16 will be determined by the time duration of the on and off periods of controlled rectifier 28. The duration of the nonconducting periods of controlled rectifier 28 is determined by the setting of the potentiometer resistor 102 which is adjusted by the accelerator pedal 98. With the system energized the capacitor 110 will be charged through resistors 118 and 102 and when the capacitor 110 attains a predetermined charge the unijunction transistor Q1 will be biased conductive to therefore discharge the capacitor 110 through the resistor 114. The charge cycle for capacitor 110 is depicted in FIG. 3 where it is seen that the capacitor charges and discharges between time periods T1 and T2 to provide a saw-tooth output.

The conduction of transistors Q2 and Q3 follows the saw-tooth waveform with the result that transistor Q4 is periodically biased nonconductive since the base of transistor Q4 is coupled to the output of transistor Q3 through conductor 126. The transistor Q4 will be biased nonconductive at time T2 shown in FIG. 3 which through the action of the monostable multivibrator biases transistor Q5 conductive. The voltage across transistor Q5 at time T2 therefore drops to substantially zero or the saturation voltage drop of this transistor as is indicated on FIG. 3 with the result that junction 152 is substantially at the potential of conductor 88.

When transistor Q4 is biased nonconductive at time T2 the voltage of junction 168 approaches the voltage of conductor 94 with the result that a positive voltage is applied to the base of transistor 58 shown in FIG. 1 causing controlled rectifiers 28 and 32 to be gated conductive. This initiates the beginning of a conducting period for controlled rectifier 28 and this conducting period has a time duration indicated by T4 in FIG. 3.

The time that transistor Q5 remains conductive depends upon the RC time constant of the timing circuit including resistor 146 and capacitor 150 as modified by the conduction of transistor Q6 which has its emitter-collector circuit connected in parallel with resistor 146. The conduction of transistor Q6 is a function of the speed of rotation of the drive motor 16 since the voltage applied to the base of transistor Q6 from tap 134 is a function of the output voltage of the tachometer generator 20. Thus, the voltage at tap 134 will increase as motor speed increases and will decrease as motor speed decreases. As motor speed increases the conduction of transistor Q6, between its emitter and collector, is reduced to thereby in effect place an increased resistance in series with capacitor 150 which in effect increases the period of conduction of transistor Q5 which is identified as T4 in FIG. 3. It therefore will be appreciated that as motor speed increases the effective resistance of the circuit connected in series with capacitor 150 increases to increase the time constant and therefore increase the time period of conduction T4 of controlled rectifier 28.

When capacitor 150 reaches a predetermined voltage the transistor Q4 is biased conductive and transistor Q5 nonconductive. It is pointed out that while transistor Q5 was conductive between time periods T2 and T5 the capacitor 110 could not charge since it was bypassed by conductive transistor Q5. When transistor Q5 now is biased nonconductive at time T5 the capacitor 110 will charge between times T5 and T6 until another pulse of voltage is applied to transistor Q4 to bias it nonconductive at time T6.

Figure 3:
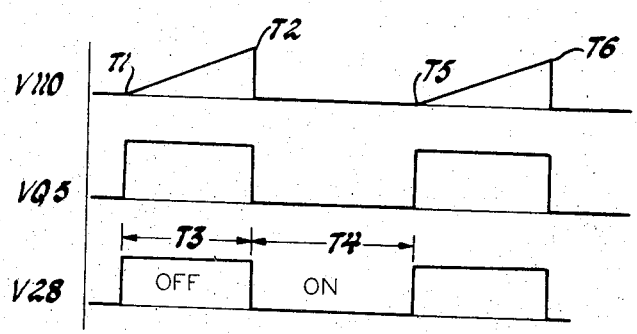
FIG. 3 illustrates in a graphical form voltages developed in certain parts of the systems illustrated in FIGS. 1 and 2.

From the foregoing it will be appreciated that the time that controlled rectifier 28 is biased to conduct, which is identified as T4 in FIG. 3, corresponds to the time required for the transistor Q5 of the monostable multivibrator (Q4 and Q5) to switch from a conductive condition to a nonconductive condition or in other words the conduction period of transistor Q5. This period of time is a function of drive motor speed due to the provision of tachometer generator 20 which controls the voltage applied to the base of transistor Q6.

The time period T3 which corresponds to the off time of controlled rectifier 28, shown in FIG. 3, is determined by the time required to charge capacitor 110 to a predetermined voltage and this charge time is controlled by variable resistor 102 which in turn is set by accelerator pedal 98. As the accelerator pedal is depressed the effective resistance in series with capacitor 110 provided by variable resistor 102 is decreased to thereby decrease time T3 or the off time of the controlled rectifier 28. This means that upon initially accelerating the drive motor and vehicle and assuming the accelerator pedal is just slightly depressed the off time T3 for the controlled rectifier 28 is at a maximum.

It will be appreciated that the off time for controlled rectifier 28 is at a maximum and its on time at a minimum when the vehicle is being initially accelerated to provide minimum current to the motor which at this time has a minimum counter EMF. On the other hand, as the operator of the vehicle calls for more voltage the off time for controlled rectifier 28 is reduced whereas the on time for the controlled rectifier is increased as motor speed increases.

It will of course be appreciated to those skilled in the art that the voltages illustrated in FIG. 3 occur repetitively during operation of the vehicle to control the voltage applied to the motor 16. It will also be appreciated that the time duration periods vary, and as an example, the time period between T1 and T2 may be different than the following time period between T5 and T6 depending upon the instantaneous adjustment of variable resistor 102. The time period T4 also varies depending upon the instantaneous output voltage of the tachometer generator 20.

The motor voltage of course will be an average value depending upon the on and off times of the controlled rectifier 28 and the motor and source of voltage are continuously connected and disconnected by the switching of controlled rectifier 28 during operation of the system.

What is claimed is:

1. A motor control system for a direct current motor comprising, a source of direct current, an electric motor, a switching device connected in series between said source of direct current and electric motor, said switching device when conductive connecting said source of direct current and said electric motor and when nonconductive disconnecting said source of direct current and said electric motor, a control circuit coupled to said switching device including means for biasing said switching device on and off and for determining the time duration of the respective on and off times of said switching device, means coupled to said control circuit and responsive to the instantaneous speed of rotation of said motor for determining the duration of the on time of said switching device as a function of motor speed, said last named means operative to increase the duration of the on time of said switching device as the speed of said motor increases and operative to decrease the duration of said on time of said switching device as the speed of said motor decreases, an adjustable control device for controlling the speed of said motor for a given load on said motor, and means coupling said control device to said control circuit such that the off time of said switching device is controlled as a function of the setting of said control device, said control device operating to decrease the off time of said switching device as said control device is adjusted in a first direction and operative to increase said off time of said switching device as said control device is adjusted in an opposite second direction, said off time having a maximum value when said control device is adjusted to provide a minimum speed for said motor and said on time having a minimum value when said motor speed is at its minimum value.

2. A motor control system for a direct current motor comprising, a source of direct current, an electric motor, a switching device connected in series between said source of direct current and said electric motor, said switching device when conductive connecting said source of direct current and said electric motor and when nonconductive disconnecting said source of direct current and said electric motor, a control circuit coupled to said switching device for biasing said switching device alternately conductive and nonconductive, said control circuit including first and second timing circuits, said first timing circuit providing a first signal which is operative to bias said switching device conductive at a predetermined time following the initiation of a timing cycle for said first timing circuit, said control circuit including a second timing circuit which is operative to produce a second signal which biases said switching device to a nonconductive condition at a predetermined time following the initiation of a timing cycle in said second timing circuit, means connecting said timing circuits such that said first timing circuit is prevented from initiating its timing cycle when said second timing circuit is operating in its timing cycle, an adjustable control device, means coupling said control device to said first timing circuit such that the duration of the time period of said first timing cycle of said first timing circuit is controlled as a function of the setting of said control device, the time period of operation of said first timing circuit decreasing as said control device is adjusted in one direction, and means for controlling the time duration of the timing cycle of said second timing circuit in response to the instantaneous speed of rotation of said motor, said last named means operating to increase the time duration of the timing cycle of said second timing circuit with increased motor speed.

3. The motor control system according to claim 2 where the adjustable control device includes a variable resistor and where this resistor forms a part of an RC circuit that controls the timing cycle of said first timing circuit.

4. An electrical propulsion system for a motor vehicle having at least one driving wheel comprising, a source of direct current, an electric motor mechanically connected to said driving wheel, a controlled rectifier connected in series between said source of direct current and said electric motor, said controlled rectifier when gated conductive connecting said source of direct current and said motor and when biased nonconductive disconnecting said source of direct current and said electric motor, a control circuit coupled to said controlled rectifier for alternately biasing said controlled rectifier to conductive and nonconductive conditions of operation, said control circuit including first and second timing circuits, said first timing circuit developing a first signal which is operative to bias said controlled rectifier conductive at a predetermined time following the initiation of a timing cycle in said first timing circuit, said control circuit including a second timing circuit developing a second signal which is operative to bias said controlled rectifier nonconductive at a predetermined time following the initiation of a timing cycle in said second timing circuit, means connecting said timing circuits such that said first timing circuit is prevented from initiating its timing cycle when said second timing circuit is operating in its timing cycle, a manually operable control for said vehicle, a variable resistor coupled to said control and forming a part of said first timing circuit, adjustment of said control in a direction to provide increased speed of said vehicle operating to decrease the time duration of said first timing cycle, and means for controlling the duration of the timing cycle of said second timing circuit in response to the instantaneous speed of rotation of said motor, said last named means operating to increase the duration of said timing cycle of said second timing circuit as motor speed increases.

5. An electric drive system for a motor vehicle comprising, a drive wheel for said vehicle, a direct current motor mechanically coupled to said drive wheel, a source of direct current, a switching device connected between said source of direct current and said drive motor for connecting and disconnecting said source of direct current and said drive motor as said switching device is periodically biased conductive and nonconductive, a control circuit coupled to said switching device for determining the respective time durations of the on and off times of said switching device, means coupled to said drive motor for providing a direct voltage which is a function of drive motor speed, means coupling said direct voltage to said control circuit, said control circuit operating to increase the on time of said switching device as motor speed is increased in response to said direct voltage, a manually operable accelerator pedal, a control device operated by said accelerator pedal, and means connecting said control device and said control circuit, said control circuit operating to decrease the off time of said switching device as said accelerator pedal is depressed and operating to increase said off time of said switching device when said accelerator pedal is released.

6. An electric drive system for a motor vehicle comprising, a vehicle having at least one drive wheel, a direct current motor mechanically coupled to said drive wheel, a source of direct current, a controlled rectifier connected between said source of direct current and said motor, said controlled rectifier operating between conductive and nonconductive states to alternately connect and disconnect said source of direct current and said electric motor to thereby vary the voltage applied to said motor, a turn-on circuit coupled with the gate of said controlled rectifier for at times gating said controlled rectifier conductive, said turn-on circuit including a first RC timing circuit, a turn-off circuit coupled to said controlled rectifier for periodically biasing said controlled rectifier nonconductive, said turn-off circuit including a second RC timing circuit, a manually operable accelerator pedal, a variable resistor coupled to said accelerator pedal, said variable resistor forming a part of said first RC timing circuit, means for developing a direct voltage which is a function of drive motor speed, and means coupling said direct voltage to said turn-off circuit, said turn-off circuit providing a turn-off signal for said controlled rectifier as a function of the charging of the capacitor of said second RC timing circuit and said direct voltage, said accelerator pedal when depressed operating to decrease the off time of said controlled rectifier, said direct voltage operating to increase the on time of said controlled rectifier as the speed of said motor increases.

7. An electric propulsion system for a motor vehicle having at least one drive wheel comprising, a source of electrical power, an electric motor, a controlled rectifier connected in series between said source of electric power and said motor, said controlled rectifier operating between conductive and nonconductive states to thereby alternately connect and disconnect said source of electrical power and said motor whereby the voltage applied to said motor is controlled, a control circuit coupled to said controlled rectifier, said control circuit including a turn-on circuit for gating said controlled rectifier to a conductive condition and a turn-off circuit for gating said controlled rectifier to a nonconductive condition, said control circuit including timing means providing predetermined controllable on and off times for said controlled rectifier, means for developing a direct voltage which is a function of motor speed, means coupling said direct voltage to said control circuit, said direct voltage increasing the time duration of the on time periods of said controlled pedal, means coupled to said accelerator pedal and to said control circuit for controlling the off time of said controlled rectifier, said off time being decreased as said accelerator pedal is depressed and increased as said accelerator pedal is released, whereby the time duration of the on and off times of said controlled rectifier are controlled respectively by the instantaneous speed of rotation of said drive motor and the instantaneous setting of said accelerator pedal.

References Cited
UNITED STATES PATENTS

| | | | |
|---|---|---|---|
| 3,358,206 | 12/1967 | Thiele | 318—341 |
| 3,361,921 | 1/1968 | Montross et al. | 318—341X |
| 3,389,318 | 6/1968 | Hoyt, Jr. | 318—345 |
| 3,500,161 | 3/1970 | Domann et al. | 318—341X |

ORIS L. RADER, Primary Examiner

R. J. HICKEY, Assistant Examiner

U.S. Cl. X.R.

318—341